3,241,992
COMPOSITION CONTAINING BIS-CITRIC ACID ESTERS AND THEIR USE

Johannes Miksch, Mannheim-Pfingstberg, Germany, Lieselotte Bauer, Frankeneck, Pfalz, Germany, Adolph Albert, deceased, late of Mannheim, Germany, by Gerda Albert nee Kerber, administrator, Albstadt, Germany, and Otto Zeiss, Schwetzingen, Germany, assignors to Joh. A. Benckiser G.m.b.H. Chemische Fabrik, Ludwigshafen (Rhine), Germany, a corporation of Germany
No Drawing. Original application Dec. 5, 1961, Ser. No. 157,615. Divided and this application Dec. 31, 1963, Ser. No. 342,840
Claims priority, application Germany, Dec. 9, 1960, B 60,417, B 60,418
16 Claims. (Cl. 106—181)

The present invention is a division of copending application Serial No. 157,615, filed December 5, 1961 and entitled: Bis-Citric Acid Esters and Process of Making and Using Same.

The present invention relates to new and valuable compositions containing citric acid esters and more particularly compositions containing citric acid esters wherein the tertiary hydroxyl group of two molecules of citric acid are esterified by a dicarboxylic acid, and to the use of such ompositions.

It is known that citric acid esters can be used as plasticizers. However, heretofore only such citric acid esters were employed for this purpose which either had been acetylated at the tertiary hydroxyl group of the citric acid or which were esterified at the carboxyl groups of citric acid while the hydroxyl group was still free. Carboxyl groups of such citric acid esters were esterified with ethyl alcohol, butyl alcohol, or isooctyl alcohol.

These known citric acid esters have many disadvantages, especially when used as plasticizers in lacquers and plastics. For instance, they exude and separate from the plastic material so that they cannot be used as packing material for food and other sensitive products.

It is one object of the present invention to provide new and valuable compositions of bis-citric esters.

A further object of the present invention is to provide plastic packing materials containing such citric acid esters as plasticizers which do not exude and separate from the packing material.

Still another object of the present invention is to provide plastic compositions containing the new citric acid esters as plasticizers.

Other objects of the present invention and advantageous features thereof will become apparent as the description proceeds.

In principle, the new esters according to the present invention correspond to the following Formula I.

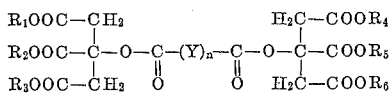

In said formula:

$R_1$, $R_2$, $R_3$, $R_4$, $R_5$, and $R_6$ represent alkyl radicals with 1 to 18 carbon atoms, and $n$ indicates one of the integers 0 and 1, and when $n$ is 1, Y indicates a member selected from the group consisting of alkylene of 1 to 8 carbon atoms, alkenylene of 2 to 3 carbon atoms, and phenylene.

The new bis-citric acid esters have proved to be excellent plasticizers. They are preferably obtained by esterifying citric acid tri-esters esterified in their carboxyl groups with alcohols having 1 to 18 carbon atoms, at their tertiary alcohol group with reactive dicarboxylic acid compounds, preferably their acid halogenides. Suitable acid halogenides are the acid halogenides of saturated aliphatic dicarboxylic acids, such as oxalic acid, malonic acid, succinic acid, glutaric acid, adipic acid, pimelic acid, suberic acid, azelaic acid, sebacic acid, and the like, the acid halogenides of unsaturated aliphatic dicarboxylic acids, such as fumaric acid, citraconic acid, itaconic acid, and the acid halogenides of aromatic dicarboxylic acids, such as phthalic acid, isophthalic acid, terephthalic acid, and others.

The new citric acid esters wherein not only the carboxyl groups but also the tertiary alcohol group are esterified, are physiologically well tolerated compounds. They can be added as plasticizers, for instance, to various types of plastisols, organosols, nitrocellulose lacquers, and the like plastic compositions alone or in mixture with other citric acid esters of the same type or with other additives and/or plasticizers. They are also used with advantage as adjuvants in the dyeing of textiles. Blocking of lacquers and plastics, for instance, of polyvinyl chloride films, nitrocellulose lacquers, and the like is prevented by the addition of such citric acid esters. The new citric acid esters can be incorporated not only into emulsion polymers and/or suspension polymers, for instance, of polyvinyl chloride, copolymers of polyvinyl chloride and polyvinyl acetate, polyvinylidene chloride, copolymers of polyvinyl chloride and polyvinylidene chloride, polyvinyl acetate, copolymers of butadiene and acrylonitrile, and the like.

Furthermore, the new citric acid esters can also be employed for such purpose for which heretofore other citric acid esters were used. The plasticizing property of the new citric acid esters is especially pronounced when $R_1$, $R_2$, $R_3$, $R_4$, $R_5$, and $R_6$ in the esters of Formula I are alkyl radicals with 1 to 18 carbon atoms and preferably radicals with 1 to 8 carbon atoms. $R_1$ to $R_6$ may be the same or different alkyl radicals.

The following examples serve to illustrate the present invention without, however, limiting the same thereto.

EXAMPLE 1

*Malonic acid 1,3-bis-citric acid triethyl ester*

14 g. of malonylchloride (0.1 mole) and 55 g. of citric acid triethyl ester (0.2 mole) are heated to 80° C. for 5 hours while stirring. The crude ester is poured into water with stirring and is neutralized by the addition of sodium bicarbonate solution. The ester layer is separated from the aqueous layer and is washed with water several times. Thereafter, the ester is dissolved in ether and the ethereal solution is dried over sodium sulfate. After evaporating the ether, the malonic acid 1,3-bis-(citric acid triethyl) ester remains as a colorless oil.

Yield: 75% of the theoretical yield. Saponification number: 718 (theoretical value: 723).

EXAMPLE 2

*Succinic acid 1,4-bis-(citric acid trimethyl) ester*

15.5 g. of succinic acid dichloride (0.1 mole) and 46.8 g. of citric acid trimethyl ester (0.2 mole) are heated to 100° C. for 5 hours while stirring. The reaction mixture is then poured into water and is neutralized with the addition of sodium bicarbonate solution. After repeated treatment with water, the initially oily compound is obtained in crystalline form. The succinic acid 1,4-bis-(citric acid trimethyl) ester is obtained in a yield of 70% of the theoretical yield. Saponification number: 813 (theoretical value: 815).

EXAMPLE 3

*Succinic acid 1,4-bis-(citric acid triethyl) ester*

15.5 g. of succinic acid dichloride (0.1 mole) and 55 g. of citric acid triethyl ester (0.2 mole) are heated to 100° C. in a water bath for 9 hours while stirring. The reaction mixture is then poured into water and is neutralized by the addition of sodium bicarbonate solution. After repeated washing with water, the initially oily ester solidifies. The succinic acid 1,4-bis-(citric acid triethyl) ester is obtained in a yield of 83% of the theoretical yield. Saponification number: 707 (theoretical value: 707).

EXAMPLE 4

*Succinic acid 1,4-bis-(citric acid tri-n-propyl) ester*

46.5 g. of succinic acid dichloride (0.3 mole) and 191 g. of citric acid tri-n-propyl ester (0.6 mole) are heated in the water bath to 80–90° C. for 8 hours while stirring. The crude ester is then poured into water, neutralized by the addition of sodium bicarbonate, and separated after washing with water. The ester is further purified by dissolving it in ether, washing the ethereal solution with water, and distilling off the ether after drying the solution over sodium sulfate. Succinic acid 1,4-bis-(citric acid-tri-n-propyl) ester is obtained in a yield of 70% of the theoretical yield. Saponification number: 625 (theoretical value: 624).

EXAMPLE 5

*Succinic acid 1,4-bis-(citric acid tri-n-butyl) ester*

46.5 g. of succinic acid dichloride (0.3 mole) and 144 g. of citric acid tri-n-butyl ester (0.4 mole) are heated at 100–110° C. for 7 hours while stirring. Subsequently, the crude ester is poured into water, neutralized by the addition of sodium bicarbonate, washed with water and separated. The ester is dissolved in ether. The ether solution is washed with water, dried over sodium sulfate and the ether is distilled off. Thereby, the succinic acid 1,4-bis-(citric acid tri-n-butyl) ester is obtained in a yield of 68% of the theoretical yield. Saponification number: 560 (theoretical value 559).

EXAMPLE 6

*Succinic acid 1,4-bis-(citric acid tri-iso-octyl) ester*

31 g. of succinic acid dichloride (0.2 mole) and 106 g. of citric acid tri-iso-octyl ester (0.2 mole) are heated to 120° C. for about 12 hours. The reaction product is poured into water with stirring and is neutralized by the addition of sodium bicarbonate. The ester is thoroughly washed with water and dissolved in ether. The ethereal solution is dried over sodium sulfate. The ether is distilled off. Succinic acid 1,4-bis-(citric acid tri-iso-octyl) ester is obtained in a yield of 65% of the theoretical yield. Saponification number: 395 (theoretical value: 394).

EXAMPLE 7

*Glutaric acid 1,5-bis-(citric acid trimethyl) ester*

17 g. of glutaric acid dichloride (0.1 mole) and 47 g. of citric acid trimethyl ester (0.2 mole) are heated in a water bath at 80–90° C. for 6 hours while stirring. The reaction product is poured into water and is neutralized by the addition of sodium bicarbonate solution. The ester is thoroughly washed with water, dissolved in ether, and the ethereal solution is dried over sodium sulfate. After distilling off the ether, glutaric acid 1,5-bis-(citric acid trimethyl) ester is obtained in a yield of 60% of the theoretical yield. Saponification number: 790 (theoretical value: 794).

EXAMPLE 8

*Glutaric acid 1,5-bis-(citric acid triethyl) ester*

17 g. of glutaric acid dichloride (0.1 mole) and 55 g. of citric acid triethyl ester (0.2 mole) are heated in the water bath at 80–90° C. for 6 hours while stirring. The reaction product is poured into water and is neutralized by the addition of sodium bicarbonate. The ester is thoroughly washed with water, dissolved in ether, and the ethereal solution is dried over sodium sulfate. After distilling off the ether, glutaric acid 1,5-bis-(citric acid triethyl) ester is obtained in a yield of 70% of the theoretical yield. Saponification number: 686 (theoretical value: 691).

EXAMPLE 9

*Adipic acid 1,6-bis-(citric acid trimethyl) ester*

18.3 g. of adipic acid dichloride (0.1 mole) and 46.8 g. of citric acid trimethyl ester (0.2 mole) are heated to 80° C. in a water bath for 6 hours while stirring. After cooling, the reaction mixture is neutralized with an aqueous sodium bicarbonate solution, thoroughly washed with water, and the ester layer is dissolved in ether. The ethereal solution is dried over sodium sulfate and the ether is distilled off. Adipic acid 1,6-bis-(citric acid trimethyl) ester is obtained in the form of a viscous oil which crystallizes after standing for some time. Yield: 64% of the theoretical yield. Saponification number: 778 (theoretical value: 775).

EXAMPLE 10

*Adipic acid 1,6-bis-(citric acid triethyl) ester*

18.3 g. of adipic acid dichloride (0.1 mole) and 55 g. of citric acid triethyl ester (0.2 mole) are heated to 80° C. in a water bath for 6 hours while stirring. After cooling, the reaction product is neutralized by the addition of aqueous sodium bicarbonate solution. The ester is thoroughly washed with water and the ester layer is then dissolved in ether. The ethereal solution is dried over sodium sulfate and the ether is distilled off. Adipic ester 1,6-bis-(citric acid triethyl) ester is obtained in the form of an oil. Yield: 85% of the theoretical yield. Saponification number: 680 (theoretical value: 677).

EXAMPLE 11

*Adipic acid 1,6-bis-(citric acid tri-n-butyl) ester*

18.3 g. of adipic acid dichloride (0.1 mole) and 72 g. of citric acid tri-n-butyl ester (0.2 mole) are heated at 80° C. in a water bath for 6 hours while stirring. After cooling, the reaction product is neutralized by the addition of an aqueous sodium bicarbonate solution, thoroughly washed with water, and the ester layer is dissolved in ether. After drying the ethereal solution over sodium sulfate and distilling off the ether, adipic acid 1,6-bis-(citric acid tri-n-butyl) ester is obtained in the form of an oil. Yield: 80% of the theoretical yield. Saponification number: 538 (theoretical value: 540).

EXAMPLE 12

*Adipic acid 1,6-bis-(citric acid tri-iso-octyl) ester*

27.4 g. of adipic acid dichloride (0.15 mole) and 105.6 g. of citric acid tri-iso-octyl ester (0.2 mole) are heated at 80° C. in a water bath for 6 hours while stirring. After cooling, the reaction product is neutralized by the addition of an aqueous sodium bicarbonate solution, thoroughly washed with water, and the ester layer is dissolved in ether. The ethereal solution is dried over sodium sulfate and the ether is distilled off. The resulting adipic acid 1,6-bis-(citric acid tri-iso-octyl) ester is obtained in a yield of 87.5% of the theoretical yield. Saponification number: 377 (theoretical value: 384).

EXAMPLE 13

*Sebacic acid 1,10-bis-(citric acid trimethyl) ester*

23.9 g. of sebacic acid dichloride (0.1 mole) and 46.8 g. of citric acid trimethyl ester (0.2 mole) are heated to 80–90° C. for 6 hours while stirring. The resulting reaction product is poured into water while stirring, neutralized by the addition of sodium bicarbonate, and the ester layer is then thoroughly washed with water and dissolved in ether. The ethereal solution is dried over sodium sulfate. The ether is distilled off. Sebacic acid 1,10-bis-(citric acid trimethyl) ester is obtained as a viscous oil which crystallizes on standing. Yield: 63% of the theoretical yield. Saponification number: 704 (theoretical value: 707).

EXAMPLE 14

*Sebacic acid 1,10-bis-(citric acid triethyl) ester*

24 g. of sebacic acid dichloride (0.1 mole) and 55 g. of citric acid triethyl ester (0.2 mole) are heated to 80–90° C. for 6 hours while stirring. The resulting reaction product is poured into water while stirring, and is neutralized by the addition of sodium bicarbonate. The ester layer is then thoroughly washed with water and is dissolved in ether. The ethereal soltuion is dried over sodium sulfate. After distilling off the ether, sebacic acid 1,10-bis-(citric acid triethyl) ester is obtained as a viscous oil. Yield: 79% of the theoretical yield. Saponification number: 623 (calculated: 624).

EXAMPLE 15

*Succinic acid 1,4-bis-(citric acid triisononyl) ester*

23 g. of succinic acid dichloride (0.15 mole) and 114 g. of triisononyl citrate (0.2 mole) are heated in a water bath to 90° C. for 24 hours while stirring. The resulting crude ester is poured into water, neutralized by the addition of sodium bicarbonate, and thoroughly washed with water. The separated ester is further purified by dissolving it in ether, washing the ethereal solution with water, drying the solution over sodium sulfate, and distilling off the ether. Succinic acid 1,4-bis-(citric acid triisonony1) ester is obtained in a yield of 79%. Saponification number: 360 (theoretical value: 367).

EXAMPLE 16

*Succinic acid 1,4-bis-(citric acid triisodecyl) ester*

23 g. of succinic acid dichloride (0.15 mole) and 122 g. of triisodecyl citrate (0.2 mole) are heated to 90° C. for 25 hours. The resulting reaction product is poured into water while stirring and neutralized by the addition of sodium bicarbonate. The ester is thoroughly washed with water and is dissolved in ether. The ethereal solution is dried over sodium sulfate. After distilling off the ether, succinic acid 1,4-bis-(citric acid triisodecyl) ester is obtained in a yield of 85%. Saponification number: 345 (theoretical value 343).

EXAMPLE 17

*Succinic acid 1,4-bis-(citric acid tricyclohexyl) ester*

39 g. of succinic acid dichloride (0.25 mole) and 175 g. of tricyclohexyl citrate (0.4 mole) are heated to 100° C. for 10 hours while stirring and subsequently to 130–140° C. for 6 hours. The reaction product is poured into water and is neutralized by the addition of sodium bicarbonate. The ester layer is thoroughly washed with water and dissolved in ether. The ethereal solution is dried over sodium sulfate and the ether is distilled off. Succinic acid 1,4-bis-(citric acid tricyclohexyl) ester is obtained in a yield of 75% of the theoretical yield. Saponification number: 460 (theoretical value: 468).

EXAMPLE 18

*Azelaic acid 1,9-bis-(citric acid triethyl) ester*

45 g. of azelaic acid dichloride (0.2 mole) and 111 g. of triethyl citrate (0.4 mole) are heated to 80–90° C. in a water bath for 9 hours while stirring. The reaction product is poured into water, neutralized by the addition of sodium bicarbonate, and thoroughly washed with water. On drying in a vacuum, azelaic acid 1,9-bis-(citric acid triethyl) ester is obtained in a yield of 81% of the theoretical yield. Saponification number: 638 (theoretical value: 636).

EXAMPLE 19

*Phthalic acid bis-(citric acid triethyl) ester*

51 g. of phthalic acid dichloride (0.25 mole) and 110 g. of triethyl citrate (0.4 mole) are heated to 90–100° C. for 8 hours while stirring and thereafter to 140° C. for 10 hours. The crude ester is poured into water, neutralized by the addition of sodium bicarbonate, and dissolved in ether. After drying over sodium sulfate and distilling off the ether, phthalic acid bis-(citric acid triethyl ester) is obtained in a yield of 70% of the theoretical yield. Saponification number: 654 (calculated 657).

The following tables show that the new citric acid esters according to the present invention have the surprising property to be highly resistant to oils and fats. This property is of the greatest importance for their technical use. Heretofore, films and foils as they were employed as packing materials for edible oils or fats or foodstuffs which contain such oils or fats could be produced only by using plasticizers which give up the plasticizer to the food stuff so that adulteration thereof to an inadmissible degree could not be avoided. In contrast thereto, foils or films which have been made with the addition of citric acid esters according to the present invention can be used without any difficulty as packing materials for oil and/or fat-containing foodstuff, because such plasticizers do not pass over into the oils or fats. This result is rather surprising because it is known that only plasticizers of the higher polymer polyester type have such properties. Furthermore, the citric acid esters according to the present invention may be used to prevent exudation and migration of primary plasticizers used from such foils or films into other foils or films or into fat or oil containing materials on contact therewith. This result is achieved, for instance, by providing the conventional foils or films with covering or lining layers containing only citric acid esters according to the present invention. Such covering or lining layers may be produced by laminating, painting, coating, or in any other suitable manner.

The following Table I shows the loss in weight of plasticizer on contact of soybean oils with a polyvinyl chloride foil containing the plasticizer. The test foils were obtained by thoroughly mixing 60 parts of an emulsion polyvinyl chloride sold under the trademark "Vestolit P" by Chemische Werke Huels, Germany, and 40 parts of the respective plasticizer or mixture of plasticizers. The mixture was homogenized and converted into a film layer of a thickness of 300–400µ. Gelation was effected by heating to 180° C. for 10 minutes. The oil resistance of the plasticizer was determined by contacting films of the same size and area with a special soybean oil at 40° C. for 24 hours.

TABLE I

| Test. No. | Plasticizer of plasticizer mixture | Percent loss in weight into soybean oil |
|---|---|---|
| 1 | 40 parts of succinic acid 1,4-bis-(citric acid triethyl) ester. | 0.4 |
| 2 | 30 parts of succinic acid 1,4-bis (citric acid triethyl) ester, 10 parts of acetyl tributyl citrate sold under the trademark "Citrofol B II." | 1.9 |
| 3 | 20 parts of succinic acid 1,4-bis (citric acid triethyl) ester, 20 parts of "Citrofol B II." | 2.5 |
| 4 | 10 parts of succinic acid 1,4-bis (citric acid triethyl) ester, 30 parts of "Citrofol B II." | 5.1 |
| 5 | 40 parts of succinic acid 1,4-bis-(citric acid tripropyl) ester. | 2.6 |
| 6 | 4.5 parts of glutaric acid 1,5-bis-(citric acid triethyl) ester, 35.5 parts of "Citrofol B II." | 5.2 |
| 7 | 40 parts of adipic ester 1,6-bis-(citric acid triethyl) ester. | 3.2 |
| 8 | 4.5 parts of sebacic acid 1,10-bis-(citric acid triethyl ester), 35.5 parts of "Citrofol B II." | 4.1 |
| 9 | 20 parts of succinic acid 1,4-bis-(citric acid tricyclohexyl) ester, 20 parts of "Citrofol B II." | 0.7 |
| 10 | 40 parts of azelaic acid 1,4-bis-(citric acid triethyl) ester. | 1.2 |
| 11 | 40 parts of phthalic acid bis-(citric acid triethyl) ester. | 1.9 |
| 12 | 20 parts of glutaric acid 1,5-bis-(citric acid trimethyl) ester, 20 parts of "Citrofol B II." | 1.7 |
| 13 | 20 parts of adipic acid 1,6-bis-(citric acid trimethyl ester), 20 parts of "Citrofol B II." | 4.5 |
| 14 | 20 parts of sebacic acid 1,10-bis-(citric acid trimethyl) ester, 20 parts of "Citrofol B II." | 1.9 |
| 15 | Comparative test with 40 parts of "Citrofol B II." | 7.4 |
| 16 | Comparative test with 40 parts of dibutylphthalate. | 9.9 |
| 17 | Comparative test with 40 parts of dinonylphthalate. | 14.5 |
| 18 | Comparative test with 40 parts of dioctylphthalate. | 13.0 |

It is evident that the citric acid esters according to the present invention are far superior in their resistance to exudation and dissolution by oils to the known citric acid esters such as acetyl tributyl citrate.

The test results given in Table II were obtained with foils produced by mixing polyvinyl chloride sold under the trademark "Vestolit P" and the respective plasticizer, homogenizing the mixture, converting it into a film and gelatinizing the film at 180° C. for 10 minutes. The oil resistance was determined by contacting the film with special soybean oil at 20° C. for 10 days.

TABLE II

| Test. No. | Composition of the foils | Percent loss in weight into soybean oil |
|---|---|---|
| 1 | 60 parts of "Vestolit P", 40 parts of glutaric acid 1,5-(citric acid triethyl) ester. | 1.33 |
| 2 | 60 parts of "Vestolit P", 40 parts of sebacic acid 1,10-bis-(citric acid triethyl)ester. | 1.44 |

The citric acid esters according to the present invention are also used with great advantage as plasticizers for finishing vegetable fibers and regenerated cellulose, fabrics, paper, and cardboard which materials have been impregnated with synthetic resins for producing materials of improved wet strength, for rendering them non-creasing, and for other purposes. The materials to be finished are impregnated with solutions of water soluble initial condensation products of the carbamide resin type based on methylol-urea, dimethylol-urea, methylol-melamine. Such initial condensation products are, for instance, incompletely polymerized methyl ethers of methylol-melamines which contain at least 2.8 moles of bound formaldehyde and 2 moles of bound methanol per mole of melamine. Other products used for such impregnation are formaldehyde condensation products with 2,6-diamino-4-methyl-1,3,5-triazine or pentamethyl triamino triazine, or 2,4,6-triamino-1,3,5-triazine. Thereby, additions of 1% to 10% of the citric acid ester according to the present invention, calculated for the solid content of the solution of the initial condensation product, are added. Such an addition of citric acid esters according to the present invention markedly improves in various respects the materials when impregnated with such synthetic resins. The bis-citric acid esters according to the present invention are preferably used in the form of an aqueous emulsion whereby di-tridecyl citrate has proved to be an especially suitable emulsifier. The preferred emulsifier is the sodium salt of said di-tridecyl citrate.

In addition to the above mentioned plastic materials, synthetic resins, and lacquers, the bis-citric acid esters according to the present invention may also be used with great advantage for plasticizing polyamides, for instance, polyamides made from caprolactam or from hexamethylene diamine and adipic acid, or similar polyamides. Other polyamides made by reacting other organic dicarboxylic acids and other organic diamines, for instance, the polyamide sold under the trademark "Ultramid 1C 6A" by Badische Anilin- und Sodafabrik, Ludwigshafen/Rhein, Germany; compare also German application (published) No. 1,012,633 of January 14, 1958, Chemische Fabrik Pfersee G.m.b.H. of Augsburg, Germany; O. Hansen "Das Papier" vol. 4, page 137 (1950); L. Dieserenz "Neue Verfahren in der Technik der chemischen Veredlung der Textilfasern" (in translation: New Processes in Chemically Improving Textile Fibers) vol. III, pages 520–535, published by Birkhaeuser of Basel and Stuttgart, 1952.

The citric acid esters according to the present invention can not only be used in nitro cellulose lacquers as stated hereinabove but also in multicomponent lacquers containing several components with great advantage. Components of such lacquers are, for instance, the polyurethanes as they are sold under the trademarks "Desmodur" and "Desmophen" by Farbenfabriken Bayer of Leverkusen, Germany.

Surprising improvements are also achieved when incorporating the bis-citric acid esters according to the present invention into chlorinated rubbers and lacquers made therefrom, into hydrochlorinated rubber and especially into films produced therefrom as they are known as pliofilm.

The following example illustrates the use of the new citric acid esters according to the present invention as adjuvants in the dyeing of textiles without, however, limiting the same thereto.

EXAMPLE 20

A polyamide fabric made of nylon 6 (caprolactam polycondensation product) fibers is dyed in the conventional manner on a jigger by passing it at full width through dye baths at a ratio of fabric to dye liquor of 1:30. The dye bath contains: 3% of the acid dyestuff sold under the trademark "Telon light blue RR" by Farbenfabriken Bayer, Leverkusen; 1.5% of 30% acetic acid; 1.5% of ammonium acetate.

The following citric acid esters are added to said dye baths:

(a) 2 g./l. of succinic acid 1,4-bis-(citric acid trimethyl) ester;

(b) 2 g./l. of succinic acid 1,4-bis-(citric acid triethyl) ester;

(c) 2 g./l. of succinic acid 1,4-bis-(citric acid tributyl) ester.

The dye baths (a), (b), and (c) are prepared by adding the respective citric acid ester to the required amount of water heated to 40–50° C. and placed in a vessel provided with a high-speed stirring device of the Starmix-type. To each bath there are added, while stirring, 0.5 g./l. of an aliphatic polyglycol ether sold under the trademark "Emulgator Fox" by the firm Chemische Werke Huels. After thoroughly mixing by vigorous stirring the citric acid ester and the emulsifier for five minutes, the above mentioned dyestuff and chemicals are added while continuing stirring.

The following known dyeing adjuvants are used, in place of the above mentioned succinic acid bis-citric acid esters:

(d) 0.67 g./l. of the anion-active adjuvant composed of sodium paraffin sulfonate and alkyl aryl polyglycol ether and sold under the trademark "Levapon TH highly concentrated" by the firm Farbenfabriken Bayer, Leverkusen, Germany.

(e) 2 g./l. of the adjuvant composed of a fatty alcohol and an ester sulfate and sold under the trademark "Etapuron N" by the firm Chemische Fabrik G.m.b.H., Düren, Germany.

The nylon 6 fabric is then dyed in these five dye baths in the conventional manner. Surprisingly it was found that the depth of color of the fabric dyed in dye baths (a), (b), and (c) was far superior to that of the fabric dyed in dye baths (d) and (e) containing conventional dyeing adjuvants.

Of course, many changes and variations in the dicarboxylic acid and alcohol components of the new citric acid esters, in the amounts in which these new esters are added to synthetic resins and plastic materials, and the like, in the use of said esters, and the like may be made by those skilled in this art in accordance with the principles set forth herein and in the claims annexed hereto.

We claim:

1. An article of plastic material selected from the group consisting of butadiene-acrylonitrile copolymers, nitro cellulose, chlorinated rubber, hydrochlorinated rubber, homopolymers of vinyl compounds selected from the group consisting of vinyl chloride, vinyl acetate and vinylidene chloride, and copolymers of said vinyl compounds, said plastic material having incorporated therein, as plasticizer, the bis-citric acid ester of the formula

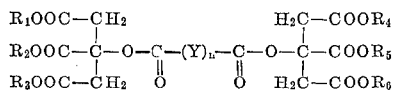

wherein:

$R_1$, $R_2$, $R_3$, $R_4$, $R_5$, and $R_6$ indicate alkyl with 1 to 18 carbon atoms;

$n$ indicates one of the integers 0 and 1, and when $n$ is 1,

Y indicates a member selected from the group consisting of alkylene of 1 to 8 carbon atoms, alkenylene of 2 to 3 carbon atoms, and phenylene, said plasticizer being incorporated in an amount between about 4.5 parts and about 40 parts of plasticizer for 60 parts of said plastic material.

2. A plasticized resinous polyamide material selected from the group consisting of polycondensation products of caprolactam and polycondensation products of diamines with dicarboxylic acids, said plasticized polyamide material having incorporated therein, as plasticizer, the bis-citric acid ester of the formula

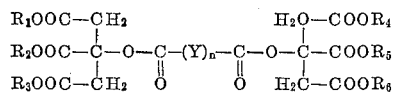

wherein:

$R_1$, $R_2$, $R_3$, $R_4$, $R_5$, and $R_6$ indicate alkyl with 1 to 18 carbon atoms;

$n$ indicates one of the integers 0 and 1, and when $n$ is 1,

Y indicates a member selected from the group consist- of alkylene of 1 to 8 carbon atoms, alkylene of 2 to 3 carbon atoms, and phenylene, said plasticizer being incorporated in an amount between about 4.5 parts and about 40 parts of plasticizer for 60 parts of said polyamide material.

3. An article of a plastic material selected from the group consisting of butadiene-acrylonitrile copolymers, nitro cellulose, chlorinated rubber, hydrochlorinated rubber, homopolymers of vinyl compounds selected from the group consisting of vinyl chloride, vinyl acetate, and vinylidene chloride, and copolymers of said vinyl compounds, said plastic material having incorporated therein, as plasticizer, the bis-citric acid ester of the formula

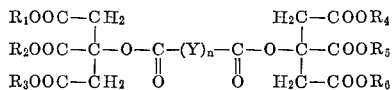

wherein:

$R_1$, $R_2$, $R_3$, $R_4$, $R_5$, and $R_6$ indicate alkyl with 1 to 18 carbon atoms;

$n$ indicates one of the integers 0 and 1, and when $n$ is 1,

Y indicates a member selected from the group consisting of alkylene of 1 to 8 carbon atoms, alkylene of 2 to 3 carbon atoms, and phenylene, said plasticizer being incorporated in an amount between about 4.5 parts and about 40 parts of plasticizer for 60 parts of said plastic material.

4. A plasticized resinous polyamide material selected from the group consisting of polycondensation products of caprolactam and polycondensation products of diamines with dicarboxylic acids, said plasticized polyamide material having incorporated therein, as plasticizer, the bis-citric acid ester of the formula

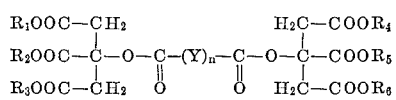

wherein:

$R_1$, $R_2$, $R_3$, $R_4$, $R_5$ and $R_6$ indicate alkyl with 1 to 18 carbon atoms, $n$ indicates one of the integers 0 and 1, and when $n$ is 1, Y indicates a member selected from the group consisting of alkylene of 1 to 8 carbon atoms, alkenylene of 2 to 3 carbon atoms, and phenylene, said plasticizer being incorporated in an amount between about 4.5 parts and about 40 parts of plasticizer for 60 parts of said polyamide material.

5. A resinous composition comprising a major portion of a synthetic resinous material selected from the group consisting of butadiene-acrylonitrile copolymers, nitro cellulose, chlorinated rubber, hydrochlorinated rubber, a homopolymer of a polymerizable monomer containing a vinyl group and copolymers of said monomer with a copolymerizable monomer, said resinous material being plasticized with the bis-citric acid ester of the formula

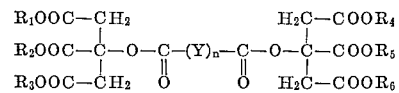

wherein:

$R_1$, $R_2$, $R_3$, $R_4$, $R_5$, and $R_6$ indicate alkyl with 1 to 18 carbon atoms, $n$ indicates one of the integers 0 and 1, and when $n$ is 1, Y indicates a member selected from the group consisting of alkylene of 1 to 8 carbon atoms, alkenylene of 2 to 3 carbon atoms, and phenylene, said plasticizer being incorporated in an amount between about 4.5 parts and about 40 parts of plasticizer for 60 parts of said synthetic resinous material.

6. A resinous composition comprising a major portion of a synthetic resinous material selected from the group consisting of butadiene-acrylonitrile copolymers, nitro cellulose, chlorinated rubber, hydrochlorinated rubber, polycondensation products of urea and formaldehyde, polycondensation products of melamine and formaldehyde, polycondensation products of amino substituted triazines and formaldehyde, polymers of the methyl ether of methylol melamine, polyamide-polycondensation products of caprolactam, polyamide-polycondensation products of diamines with dicarboxylic acids, polyurethane resins, homopolymers of vinyl compounds selected from the group of vinyl chloride, vinyl acetate, and vinylidene chloride, and copolymers of said vinyl compounds, said synthetic resinous materal being plasticized with the bis-citric acid ester of the formula

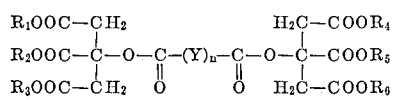

wherein:

$R_1$, $R_2$, $R_3$, $R_4$, $R_5$ and $R_6$ indicate alkyl with 1 to 18 carbon atoms, $n$ indicates one of the integers 0 and 1, and when $n$ is 1, Y indicates a member selected from the group consisting of alkylene of 1 to 8 carbon atoms, alkenylene of 2 to 3 carbon atoms, and phenylene, said plasticizer being incorporated in an amount between about 4.5 parts and about 40 parts of plasticizer for 60 parts of said synthetic resinous composition.

7. A resinous composition consisting essentially of a synthetic resinous material selected from the group consisting of polyvinylchloride, copolymers of vinyl chloride and vinyl acetate, polyvinylidene chloride, copolymers of vinyl chloride and vinylidene chloride, polyvinyl acetate, copolymers of butadiene and acrylonitrile, nitro cellulose, polycondensation products of urea and formaldehyde, polycondensation products of melamine and formaldehyde, polycondensation products of amino substituted triazines and formaldehyde, polymers of the methyl ether of methylol melamine, resinous polycondensation products of caprolactam, resinous polycondensation products of diamines and dicarboxylic acids, resinous polyurethanes, chlorinated rubbers and hydrochlorinated rubbers, said synthetic resinous material being plasticized with the bis-citric acid ester of the formula

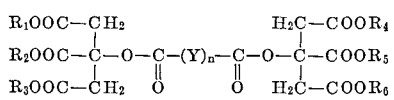

wherein:

$R_1$, $R_2$, $R_3$, $R_4$, $R_5$, and $R_6$ indicate alkyl with 1 to 8 carbon atoms, $n$ indicates one of the integers 0 and 1, and when $n$ is 1, Y indicates a member selected from the group consisting of alkylene of 1 to 8 carbon atoms, alkenylene of 2 to 3 carbon atoms, and phenylene, said plasticizer being incorporated in an amount between about 4.5 parts and about 40 parts of plasticizer for 60 parts of said resinous composition.

8. A finishing solution for improving the wet strength of articles made of vegetable and synthetic fiber material and for rendering said articles crease-resistant, said solution containing a conventional wet strength-improving resinous agent selected from the group consisting of the water-soluble initial condensation products of the carbamide resin type, based on methylol-urea, dimethylol-urea, methylol-melamine, in aqueous solution and, admixed thereto as plasticizing agent, between about 1% and about 10%, calculated for the solids content of said solution, of the bis-citric acid ester of the formula

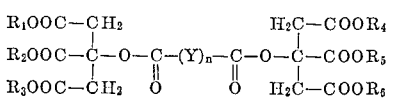

wherein:

$R_1$, $R_2$, $R_3$, $R_4$, $R_5$ and $R_6$ indicate alkyl with 1 to 18 carbon atoms, $n$ indicates one of the integers 0 and 1, and when $n$ is 1, Y indicates a member selected from the group consisting of alkylene of 1 to 8 carbon atoms, alkenylene of 2 to 3 carbon atoms, and phenylene.

9. A bath for dyeing textile materials comprising, in an aqueous medium, a conventional dyestuff and, as dyeing adjuvant emulsified therein, the bis-citric acid ester of the formula

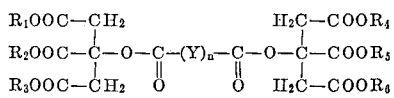

wherein:

$R_1$, $R_2$, $R_3$, $R_4$, $R_5$, and $R_6$ indicate alkyl with 1 to 18 carbon atoms, $n$ indicates one of the integers 0 and 1, and when $n$ is 1, Y indicates a member selected from the group consisting of alkylene of 1 to 8 carbon atoms, alkenylene of 2 to 3 carbon atoms, and phenylene.

10. A resinous composition comprising a major portion of a synthetic resinous material selected from the group consisting of a homopolymer of a polymerizable monomer containing a vinyl group and of copolymers of said monomer with a copolymerizable monomer, of butadiene-acrylonitrile copolymers, nitro cellulose, chlorinated rubber, and hydrochlorinated rubber, said resinous material being plasticized with about 7.5% to about 66.7% of the succinic acid 1,4-bis(citric acid triethyl) ester and about 59.2% to 0% of acetyl tributyl citrate, calculated for the resinous material.

11. A resinous composition comprising a major portion of a synthetic resinous material selected from the group consisting of a homopolymer of a polymerizable monomer containing a vinyl group and of copolymers of said monomer with a copolymerizable monomer, of butadiene-acrylonitrile copolymers, nitro cellulose, chlorinated rubber, and hydrochlorinated rubber, said resinous material being plasticized with about 7.5% to about 66.7% of succinic acid 1,4-bis-(citric acid tricyclohexyl) ester and about 59.2% to 0% of acetyl tributyl citrate, calculated for the resinous material.

12. A resinous composition comprising a major portion of a synthetic resinous material selected from the group consisting of a homopolymer of a polymerizable monomer containing a vinyl group and of copolymers of said monomer with a copolymerizable monomer of butadiene-acrylonitrile copolymers, nitro cellulose, chlorinated rubber, and hydrochlorinated rubber, said resinous material being plasticized with about 7.5% to about 66.7% of glutaric acid 1,5-(citric acid triethyl) ester and about 59.2% to 0% of acetyl tributyl citrate, calculated for the resinous material.

13. A resinous composition comprising a major portion of a synthetic resinous material selected from the group consisting of a homopolymer of a polymerizable monomer containing a vinyl group and of copolymers of said monomer with a copolymerizable monomer, of butadiene-acrylonitrile copolymers, nitro cellulose, chlorinated rubber, and hydrochlorinated rubber, said resinous material being plasticized with about 7.5% to about 66.7% of azelaic acid 1,4-bis-(citric acid triethyl) ester and about 59.2% to 0% of acetyl tributyl citrate, calculated for the resinous material.

14. A resinous composition comprising a major portion of a synthetic resinous material selected from the group consisting of a homopolymer of a polymerizable monomer containing a vinyl group and of copolymers of said monomer with a copolymerizable monomer, of butadiene-acrylonitrile copolymers, nitro cellulose, chlorinated rubber, and hydrochlorinated rubber, said resinous material being plasticized with about 7.5% to about 66.7% of sebacic acid, 1,10-bis-(citric acid triethyl) ester and about 50.2% to 0% of acetyl tributyl citrate, calculated for the resinous material.

15. A resinous composition comprising a major portion of a synthetic resinous material selected from the group consisting of a homopolymer of a polymerizable monomer containing a vinyl group and of copolymers of said monomer with a copolymerizable monomer, of butadiene-acrylonitrile copolymers, nitro cellulose, chlorinated rubber, hydrochlorinated rubber, said resinous material being plasticized with about 7.5% to about 66.7% of phthalic acid bis-(citric acid triethyl) ester and about 59.2% to 0% of acetyl tributyl citrate, calculated for the resinous material.

16. An aqueous dye bath for textile material containing, as dyeing adjuvant, about 2 g. per liter of a succinic acid 1,4-bis-(citric acid tri-lower alkyl) ester emulsified therein.

References Cited by the Examiner

UNITED STATES PATENTS 2,870,111 1/1959 Dazzi _____ 260—31.8
3,025,271 3/1962 Borchert _____ 260—31.8

FOREIGN PATENTS 629,235 10/1961 Canada.

MORRIS LIEBMAN, *Primary Examiner.*

L. T. JACOBS, *Assistant Examiner.*